(12) United States Patent
Shripathy et al.

(10) Patent No.: US 9,647,470 B2
(45) Date of Patent: May 9, 2017

(54) RECHARGEABLE BATTERY SYSTEM (75) Inventors: Bharath Shripathy, Niskayuna, NY (US); Henry Jovanovic, Chandler, AZ (US)

(73) Assignee: General Electric Company, Schenectady, NY (US)

( * ) Notice: Subject to any disclaimer, the term of this patent is extended or adjusted under 35 U.S.C. 154(b) by 984 days.

(21) Appl. No.: 13/339,677

(22) Filed: Dec. 29, 2011

(65) Prior Publication Data
US 2013/0169213 A1 Jul. 4, 2013

(51) Int. Cl.
*H01M 2/02* (2006.01)
*H02J 7/00* (2006.01)

(52) U.S. Cl.
CPC .................. *H02J 7/0042* (2013.01)

(58) Field of Classification Search
CPC .................. H01M 2010/4271; H01M 2/06
USPC ....... 320/107; 429/60, 61, 179; 439/76.1, 78
See application file for complete search history.

(56) References Cited

U.S. PATENT DOCUMENTS

| | | | | |
|---|---|---|---|---|
| 4,554,221 A * | 11/1985 | Schmid | ............... | H01M 2/1055 429/1 |
| 7,857,658 B1 * | 12/2010 | Larsen | .................... | H01M 2/20 429/1 |
| 8,053,106 B1 * | 11/2011 | Pal et al. | ...................... | 429/175 |
| 8,541,131 B2 * | 9/2013 | Lund et al. | ................... | 429/164 |
| 8,748,034 B2 * | 6/2014 | Sasaki et al. | ................. | 429/182 |
| 2004/0202927 A1 * | 10/2004 | Drea et al. | ..................... | 429/129 |
| 2006/0257729 A1 * | 11/2006 | Lee | ......................... | H01M 2/04 429/174 |
| 2007/0216226 A1 * | 9/2007 | Matsumoto et al. | ........ | 307/10.1 |
| 2008/0131760 A1 * | 6/2008 | Yamagami et al. | ............ | 429/82 |
| 2008/0169788 A1 * | 7/2008 | Bobbin et al. | ................ | 320/135 |
| 2009/0155680 A1 * | 6/2009 | Maguire et al. | .............. | 429/158 |
| 2010/0009576 A1 * | 1/2010 | Schaffer | ............... | H01M 13/514 439/676 |
| 2010/0203363 A1 * | 8/2010 | Kwak | ................. | H01M 2/0473 429/7 |
| 2010/0261045 A1 * | 10/2010 | Wu | ...................... | H01R 11/282 429/98 |

* cited by examiner

Primary Examiner — Richard Isla Rodas
Assistant Examiner — Johali Torres Ruiz
(74) Attorney, Agent, or Firm — Dority & Manning, P.A.

(57) ABSTRACT

A rechargeable battery system is disclosed. In an embodiment, the rechargeable battery system includes a rechargeable battery having a first electrical connector, an alignment plate mounted to the rechargeable battery, wherein the first electrical connector is aligned to the alignment plate, a battery management system having a second electrical connector configured to mate with the first electrical connector, wherein the second electrical connector comprises a housing, at least one alignment pin secured to the housing, and an electrical contact, wherein the alignment pin is disposed in the housing in a determined position relative to the electrical contact, and an interface plate having a first interface portion and a second interface portion wherein the first interface portion is configured to mate with the alignment plate and wherein the second interface portion is configured to mate with the alignment pin to align the first electrical connector with the second electrical connector.

15 Claims, 5 Drawing Sheets

RECHARGEABLE BATTERY SYSTEM

BACKGROUND

Technical Field

The subject matter disclosed herein relates to batteries and battery management systems.

Discussion of Art

Interfaces between batteries and battery management systems or adapters may include electrical connections for electrically interconnecting parts of the batteries, battery management systems, and/or adapters. Due to manufacturing variances, vibration during use, etc., maintaining proper alignment of the electrical connections may be a challenge. Challenges may also be presented in regards to mechanical support of the electrical connections, which may impact the reliability and ease of assembly of the battery system.

It may be desirable to have a battery and/or battery management system that differs from those that are currently available.

BRIEF DESCRIPTION

Presently disclosed is a rechargeable battery system. In an embodiment, the rechargeable battery system includes a rechargeable battery having a first electrical connector; an alignment plate mounted to the rechargeable battery, wherein the first electrical connector is aligned to the alignment plate; a battery management system having a second electrical connector configured to mate with the first electrical connector, wherein the second electrical connector comprises a housing, at least one alignment pin secured to the housing, and an electrical contact, wherein the alignment pin is disposed in the housing in a determined position relative to the electrical contact; and an interface plate having a first interface portion and a second interface portion wherein the first interface portion is configured to mate with the alignment plate and wherein the second interface portion is configured to mate with the alignment pin to align the first electrical connector with the second electrical connector.

In another embodiment, a rechargeable battery system includes an alignment plate having an alignment plate aperture; a rechargeable battery having a first electrical connector, wherein the first electrical connector extends through and is aligned by the alignment plate aperture, and the alignment plate is mounted to the rechargeable battery; a battery management system having a second electrical connector configured to mate with the first electrical connector, wherein the second electrical connector comprises a housing, at least one alignment pin, an insulator disposed within the housing, and an electrical contact at least partially disposed within the housing, wherein the alignment pin is secured to the housing in a determined position relative to the electrical contact, and wherein the insulator includes an aperture that receives the alignment pin to align the insulator within the housing; and an interface plate connected to one or both of the rechargeable battery or the battery management system; the interface plate having a first interface portion and a second interface portion, wherein the first interface portion is configured to mate with the alignment plate and wherein the second interface portion is configured to mate with the alignment pin to align the first electrical connector with the second electrical connector.

In another embodiment, a rechargeable battery system includes an alignment plate having an alignment plate aperture, wherein the alignment plate aperture is configured to receive a first electrical connector of a rechargeable battery there through; an assembly for a second electrical connector, the assembly including a housing configured to house an electrical contact of the second electrical connector; and at least one alignment pin, wherein the alignment pin is secured to the housing in a determined position relative to a position of the electrical contact when housed in the housing; and an interface plate having a first interface portion and a second interface portion, wherein the first interface portion is configured to mate with the alignment plate and wherein the second interface portion is configured to mate with the alignment pin to align the first electrical connector with the second electrical connector.

In another embodiment, a rechargeable battery system includes first means for aligning a first electrical connector of a rechargeable battery; second means for aligning a second electrical connector of a battery management system; and third means for aligning the first means and the second means so as to align the first electrical connector of the rechargeable battery for mating with the second electrical connector of the battery management system.

Also disclosed is an electrical connector for a rechargeable battery system. The electrical connector includes a die-cast housing; at least one alignment pin press-fit into to the housing; an electrical contact housed in the housing; an insulator disposed within the housing, wherein the insulator includes an aperture, and wherein the alignment pin is received in the aperture to align the insulator within the housing; wherein the alignment pin is disposed in the housing in a determined position relative to the electrical contact and the insulator secures the electrical contact in the determined position relative to the alignment pin.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Embodiments of the subject matter disclosed herein relate to a rechargeable battery system including a rechargeable battery and a battery management system, and more particularly to an interconnection between a rechargeable battery and a battery management system. A rechargeable battery for use with the present disclosure may utilize a wide variety of electrochemical cells, such as sodium-halide, sodium-sulfur, lithium-sulfur, and other available electrochemical cells used for energy storage. In one embodiment, the electrochemical cells have an operating temperature determined by the melting point of the materials utilized in the cells. For example, the operating temperature may be greater than about 100 degrees Celsius, such as between (and including) 250 degrees Celsius and 400 degrees Celsius, or between (and including) 400 degrees Celsius and 700 degrees Celsius, but other desired operating temperature are also possible. In operation, the electrochemical cells of the rechargeable battery are successively discharged and recharged as the rechargeable battery is used. During a charging operation, the rechargeable battery receives current from an external source to charge the cells. During a discharge operation, the rechargeable battery provides current to an external load. In some embodiments, a battery management system is provided to control the current provided to or from the rechargeable battery. The battery management system may control the current and/or voltage to achieve one or more purposes, such as reducing electrical noise or limiting the current or voltage based on the requirements of the rechargeable battery or the external load. The battery management system may also direct the heating, cooling, or other internal operations of the rechargeable battery and generally provide the control for operation of the rechargeable battery in a given application.

The current to or from the rechargeable battery may pass through the battery management system, and as such a reliable electrical connection is required between the rechargeable battery and the battery management system. Embodiments of the invention relate to an electrical connector or electrical connector system, and to a rechargeable battery system having such an electrical connector or electrical connector system, for electrically interconnecting a rechargeable battery and a battery management system, or otherwise.

Figure 1:
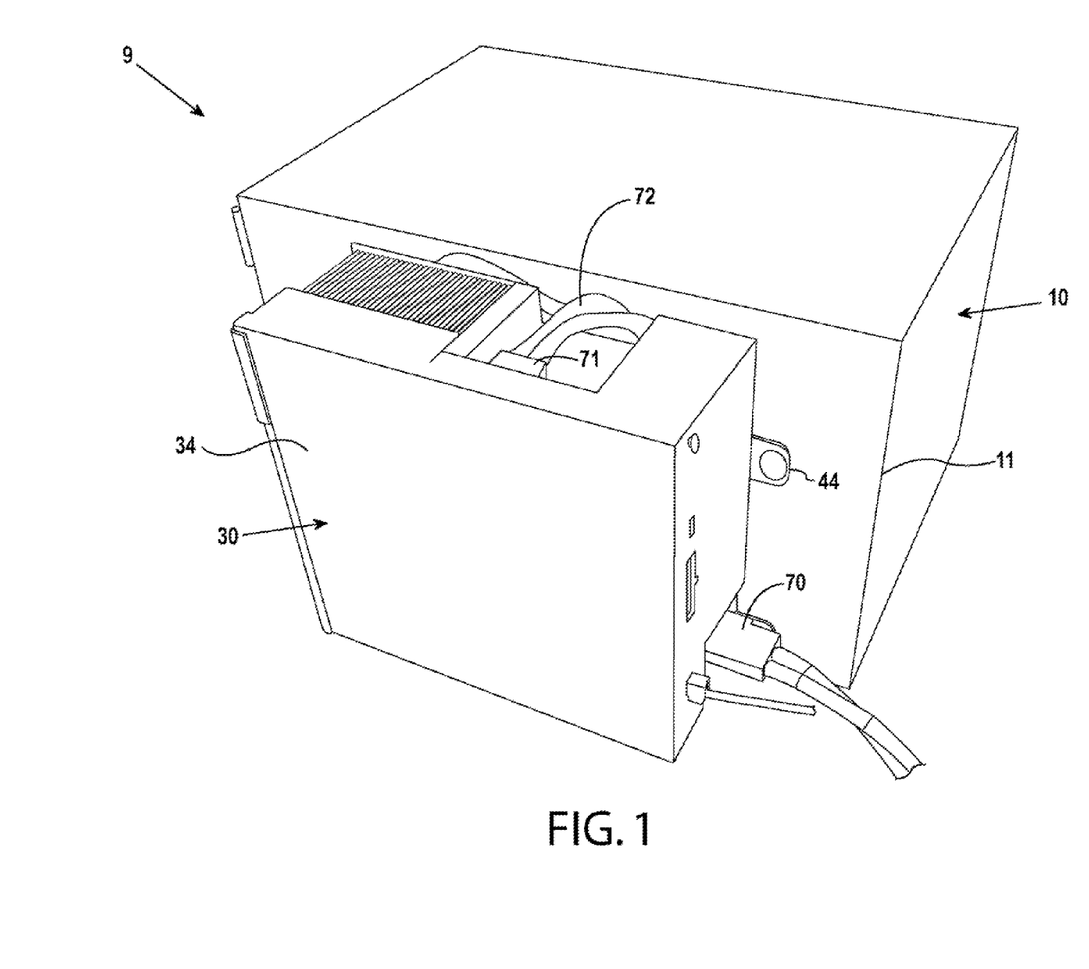
FIG. 1 is a perspective view of a rechargeable battery having a battery management system.

Referring now to FIG. 1, one embodiment of a rechargeable battery system 9 is illustrated. The rechargeable battery system includes a rechargeable battery 10 and a battery management system 30 connected to the rechargeable battery 10. In an embodiment, the battery management system 30 is secured to the rechargeable battery 10, with electrical connections for both current and data between the rechargeable battery and the battery management system. In one embodiment, the battery management system 30 has a cover 34 that mechanically interfaces with the outer casing 11 of the rechargeable battery 10. In the embodiment of FIG. 1, the cover 34 includes tabs 44 with holes for attaching the battery management system 30 with bolts, pins, or other fasteners to the outer casing 11 of the rechargeable battery 10. In other embodiments the battery management system 30 may be secured to the rechargeable battery 10 via engagement of portions of the cover 34 with corresponding portions of the outer casing 11 of the rechargeable battery 10 (e.g., tabs and slots). In an embodiment, the battery management system 30 also has at least one data socket 70 for providing data communication with a computer or other computing device (not shown), and at least one data socket 71 for providing data communication with the rechargeable battery 10. In an embodiment, the battery management system 30 is secured to the rechargeable battery 10 with a void or space between the cover 34 of the battery management system 30 and the outer casing 11 of the rechargeable battery 10. The void or space may provide clearance for data cables 72 to extend from the rechargeable battery 10 to at least one data socket 71 of the battery management system 30. The data cable 72 as shown may extend from the data socket 71 to a corresponding connection of the rechargeable battery 10. Not visible in FIG. 1 is the electrical interconnection between the rechargeable battery 10 and the battery management system 30 through which current enters and exits the rechargeable battery.

Figure 2:
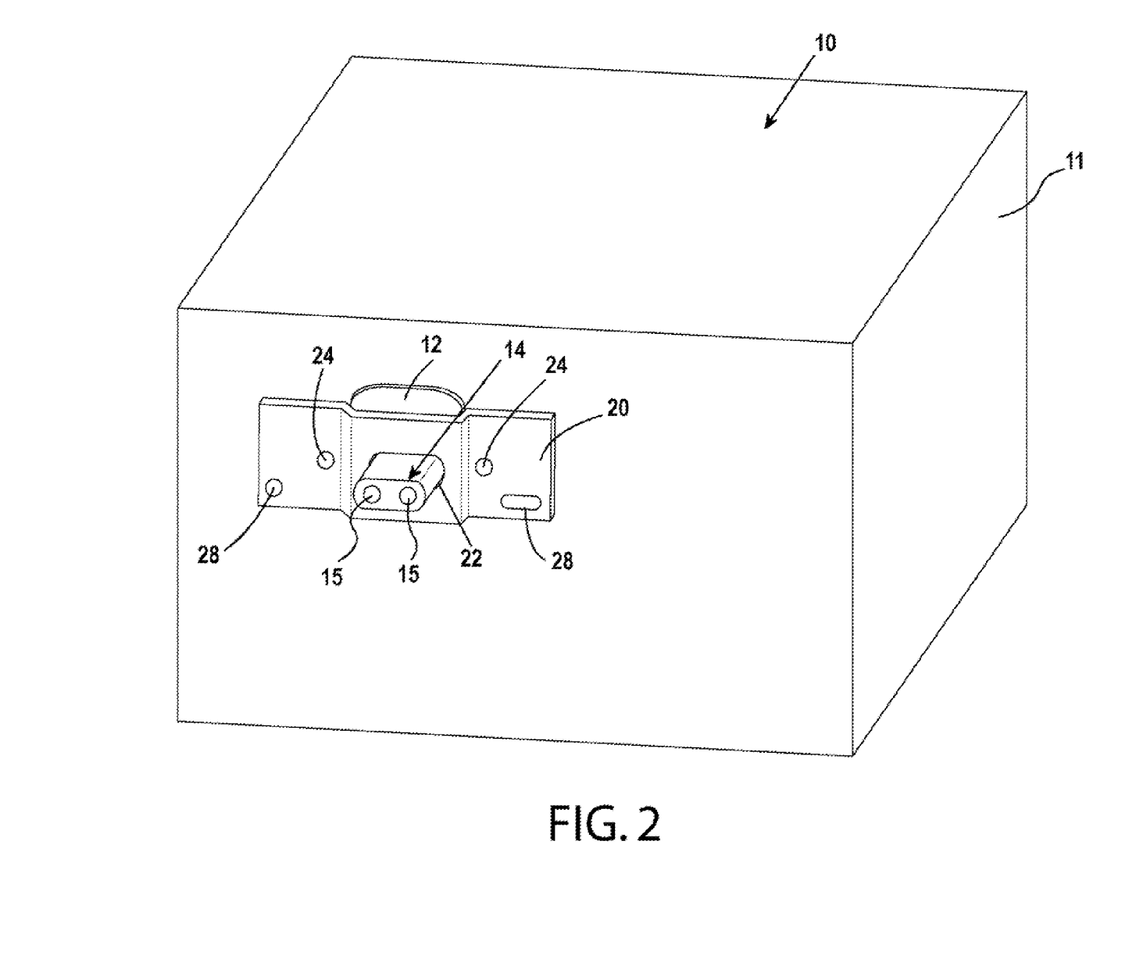
FIG. 2 is a perspective view of a rechargeable battery.

Referring now to FIG. 2, an embodiment of the rechargeable battery 10 is illustrated with the battery management system removed. The rechargeable battery 10 also includes a battery electrical connector 14. The battery electrical connector 14 is configured to mate with a corresponding battery management system electrical connector (see FIG. 4). For clarity, the battery electrical connector may be designated as a First electrical connector, and the battery management system connector may be designated as a second electrical connector for the rechargeable battery system. In many embodiments, the rechargeable battery system will have a variety of other connectors including data and power connections to the battery management system or rechargeable battery.

Figure 4:
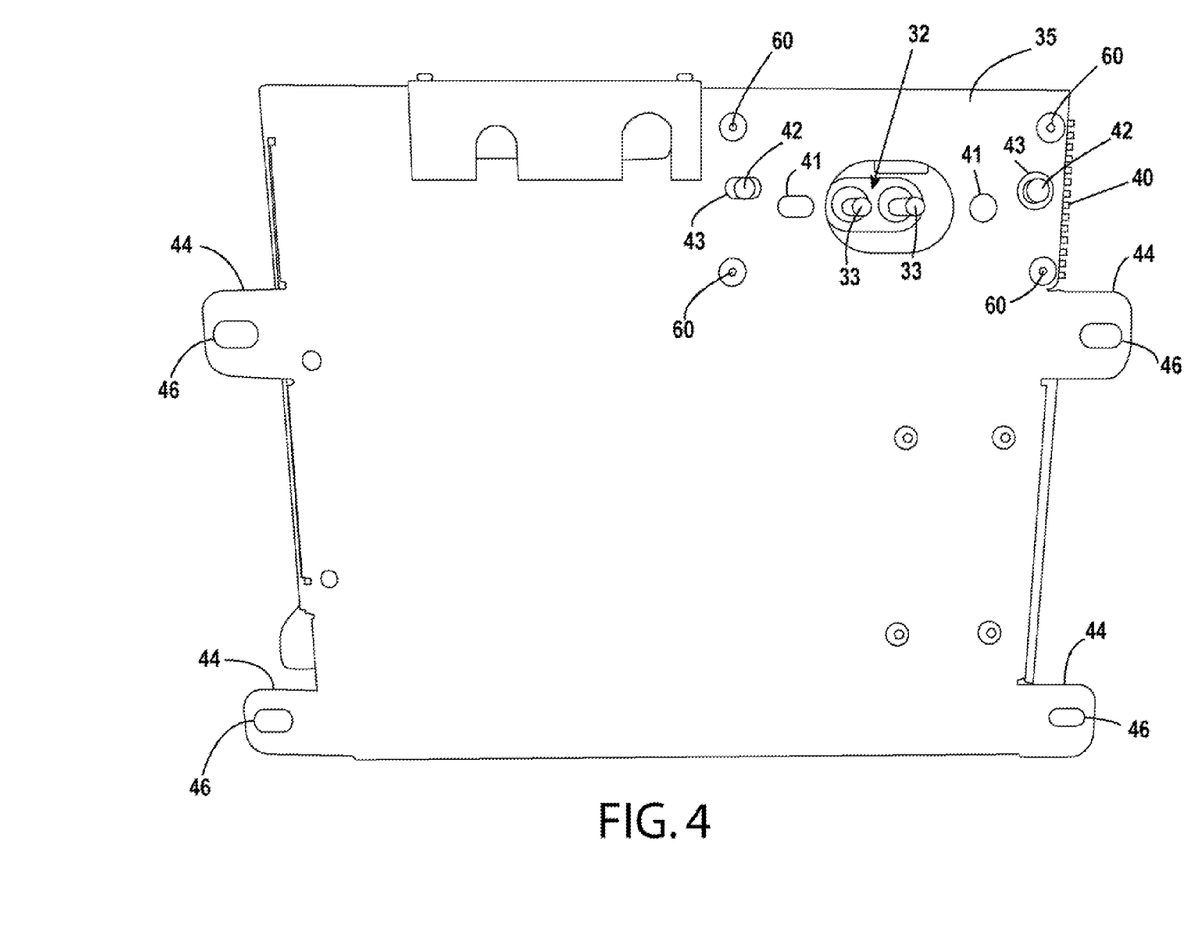
FIG. 4 is a perspective view of a battery management system.

As noted above, the rechargeable battery 10 includes an outer casing 11. In one embodiment, the battery electrical connector 14 is disposed in an aperture 12 of the outer casing 11. The outer casing 11 may be configured to surround the aperture (e.g., the aperture may be formed in the outer casing, such that the outer casing defines the aperture) and may provide mounting features for the battery electrical connector 14 to facilitate manufacturing of the rechargeable battery 10. In embodiments, the battery electrical connector 14 (i.e., the first electrical connector) includes one or more sockets 15 for receiving one or more prongs 33 (as shown in FIG. 4) of the battery management system electrical connector 32 (i.e., the second electrical connector). The one or more sockets and one or more prongs provide the electrical contacts for the first electrical connector and the second electrical connector, and the configuration of sockets, prongs, or other electrical contacts may be selected as needed for the application. In some embodiments, the tip of the prongs and opening of the sockets may be provided with a taper to assist in correcting misalignments during engagement of the prongs to the sockets. The taper may be on the prongs, or the sockets, or both. In other embodiments having electrical contacts in another configuration, a similar taper or centering feature may also be provided. In some embodiments, the electrical contacts of the first and second electrical connectors are blind mate contacts that can be mated even when the electrical contacts are not visible to the assembly personnel such as when the battery management system is being secured to the rechargeable battery. In an embodiment, the battery electrical connector 14 includes a non-conductive outer covering such as a ceramic outer covering that provides electrical insulation between the prongs or sockets of the connector and other portions of the rechargeable battery such as the outer casing 11.

As shown in FIG. 2, the rechargeable battery system 9 also includes an alignment plate 20 that is mounted to the rechargeable battery 10, such as to the outer casing 11, and positions the battery electrical connector 14. In an embodiment, the alignment plate 20 has an aperture 22 in which the battery electrical connector 14 is disposed. The aperture 22 is sized to receive and retain the battery electrical connector 14 with minimal movement of the battery electrical connector 14 within the aperture. The alignment plate 20 also includes mounts 24 for mounting the alignment plate 20 to the outer casing 11 of the rechargeable battery 10. In an embodiment the alignment plate is mounted to the rechargeable battery 10 using bolts to secure the alignment plate to the outer casing of the rechargeable battery. The alignment plate 20 also includes at least one alignment feature, such as a pin or aperture in a fixed position relative to the aperture 22. In an embodiment, the alignment plate 20 includes two guides 28, each guide being an aperture in the alignment plate body configured to receive a corresponding pin or stud for aligning the alignment plate 20 and the battery electrical connector 14 to a battery management system electrical connector. In an embodiment, one of the guides 28 is a primary alignment feature set at a determined position relative to the alignment plate aperture 22, such that when the alignment plate 20 is attached to the outer casing 11 of the rechargeable battery 10 the primary alignment guide 28 is at a desired fixed position relative to the battery electrical connector 14 of the rechargeable battery system 9. In an embodiment, the primary guide 28 defines the alignment tolerance of the battery electrical connector and ensures the battery electrical connector may satisfactorily mate with the battery management system electrical connector. In this manner, the alignment plate 20 provides a means for aligning a first electrical connector of a rechargeable battery relative to the overall rechargeable battery, e.g., relative to the outer casing 11.

Figure 3:
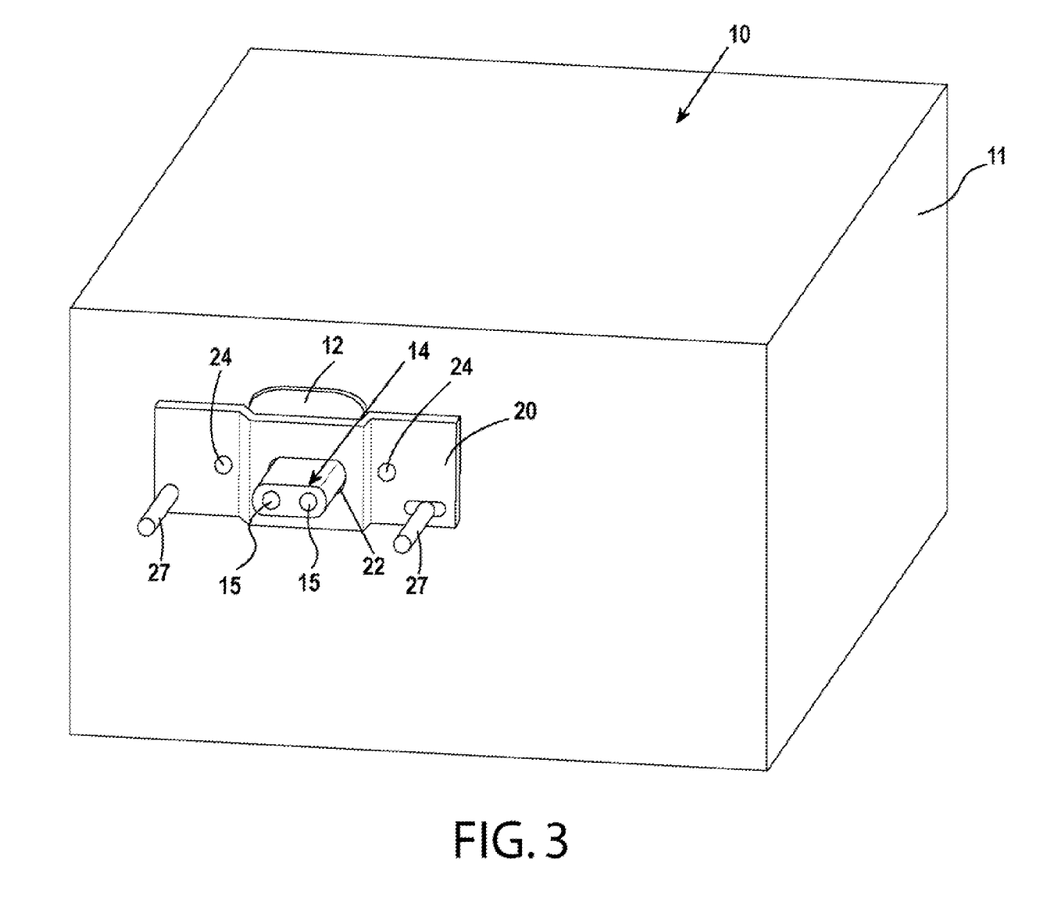
FIG. 3 is a perspective view of another rechargeable battery.

Referring now to FIG. 3, another embodiment of an alignment plate for use with a rechargeable battery is illustrated. As shown, the alignment plate 20 includes an aperture 22 configured to receive the battery electrical connector 14 as previously discussed. In an embodiment, the alignment plate 20 includes at least one alignment stud 27, in addition to or in place of the guide. The alignment stud 27 is configured to engage with a corresponding aperture for aligning the aligning plate relative to the battery management system 30 to ensure the battery electrical connector and battery management system electrical connectors are aligned for mating. In one embodiment, the alignment stud 27 is attached to the alignment plate 20, however, in other embodiments, the alignment stud 27 may be integrally formed with the alignment plate 20. In each embodiment, the alignment stud 27 is at a determined position relative to the aperture 22 and the battery electrical connector 14 of the rechargeable battery 10. By engaging the alignment stud 27 or guide 28, with a corresponding aperture or pin, mating of the battery electrical connector (i.e., first electrical connector) and the battery management system electrical connector (i.e., second electrical connector) is facilitated. In some embodiments, engagement of the alignment features also improves seating of the electrical connectors as lateral forces are absorbed or mitigated by the alignment features, reducing the likelihood of the electrical connectors binding prior to full engagement.

Referring now to FIG. 4, an embodiment of a battery management system for use in a rechargeable battery system is illustrated. The battery management system includes a battery management system electrical connector 32, which is a second electrical connector of the rechargeable battery system. The battery management system electrical connector 32 is configured to mate with the corresponding battery electrical connector 14 (see FIGS. 2 and 3). In embodiments, the rechargeable battery system includes an interface plate 35 configured to align the electrical connectors of the rechargeable battery and the battery management system. In one embodiment, the interface plate 35 is a cover plate of the battery management system 30 or portion thereof as illustrated in FIG. 4. In other embodiments, the interface plate 35 is a portion of the outer casing 11 of a rechargeable battery 10. In yet other embodiments, the interface plate 35 is a separate component that mates with one or both of the rechargeable battery or the battery management system. In each embodiment, the interface plate 35 allows the battery electrical connector 14 to mate with the battery management system electrical connector 32 to provide a reliable electrical connection for the rechargeable battery system 9.

As illustrated, the battery management system 30 includes the battery management system electrical connector 32. The battery management system electrical connector 32 includes a housing 40, such as a die-cast housing illustrated in FIG. 5. A die-cast housing may be formed in a progressive die manufacturing process capable of producing a housing with precisely placed features. The connector 32 has at least one alignment pin 42 secured to the housing 40. As shown, two alignment pins 42 are provided, each of which is press-fit into a feature of the housing 40. A press-fit connection between the alignment pins 42 and the housing 40 ensures precise positioning and stability of the alignment pins 42. In alternative embodiments, the alignment pins 42 are glued, or integrally molded into the housing 40. In yet other embodiments the alignment pins 42 are screwed or bolted into the housing. In one embodiment, the alignment pins 42 may each have a tapered lead portion configured to center the alignment pin upon engagement to the aperture. In some embodiments, the apertures of the interface plate 35 may be formed with a taper or bevel also configured to assist with engagement of the alignment pins 42 to the interface plate. The use of a taper or similar centering feature may improve the ease of assembly of the rechargeable battery system, thereby reducing manufacturing costs and simplifying the assembly process.

The battery management system electrical connector 32 also includes prongs 33 as an electrical contact 56 (or contacts) for the connector. In an embodiment, the prongs 33 are connected to a bus-bar 54 (see FIG. 5) configured to carry current to and from the rechargeable battery during operation. The prongs 33 are also configured to mate with the sockets of the battery connector (as shown in FIG. 2). In other embodiments, the electrical contact of the battery management electrical connector includes at least one socket, and the battery electrical connector includes at least one corresponding prong. In yet other embodiments, the electrical contacts may be blades, tabs, or other designs with corresponding mating features suitable for the voltages and currents required in the rechargeable battery system.

Figure 5:
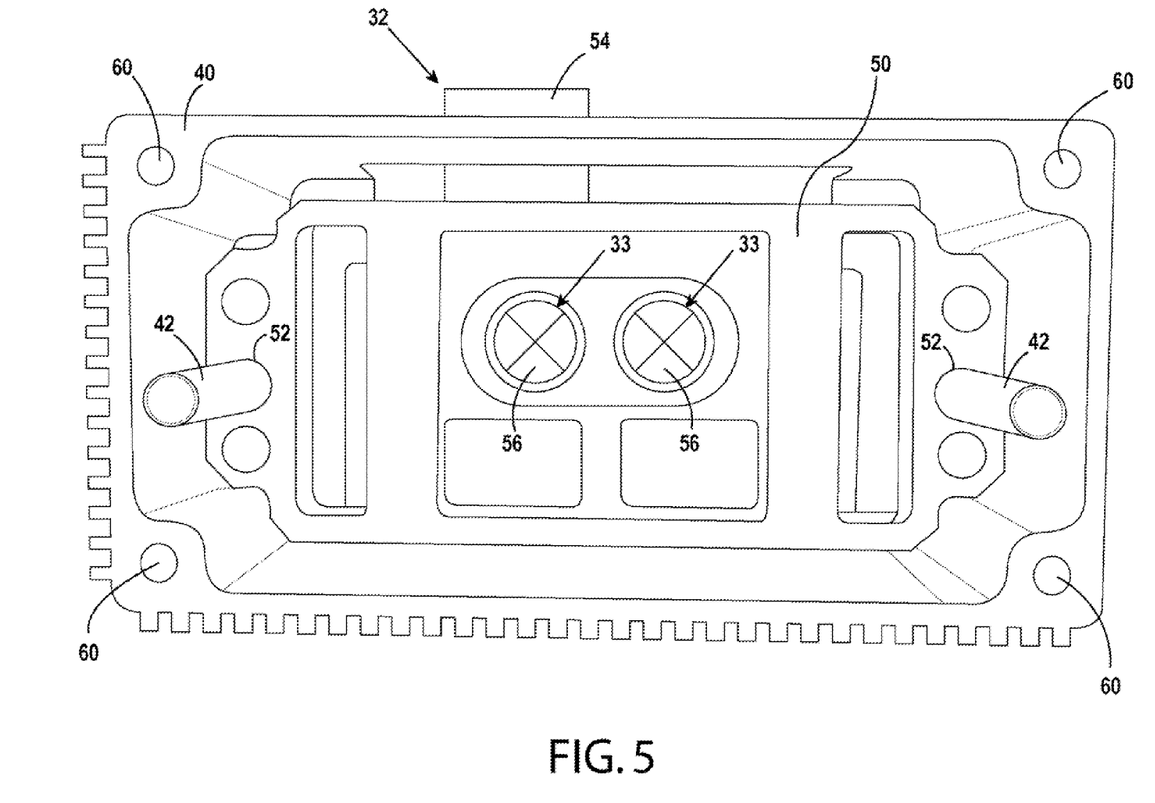
FIG. 5 is a perspective view of an alignment box for use with a battery management system.

Referring now to FIG. 5, an embodiment of the battery management system electrical connector 32 is illustrated removed from the battery management system 30. In one embodiment, two alignment pins 42 are press fit to the die cast housing 40 in a fixed position relative to the prongs 33, which form the electrical contact. In an embodiment, the prongs 33 are connected to threaded studs attached to the bus-bar 54, however other connections, including welded connections, may be used. As shown, the connector also includes an electrical insulator 50 disposed within the housing 40. The insulator 50 includes apertures 52 (insulator apertures) configured to receive the alignment pins 42 such that the insulator is positioned within the housing relative to the alignment pins. In one embodiment, the insulator 50 has two alignment pin apertures 52. In an embodiment, the insulator is installed over the alignment pins 42 after the alignment pins have been press-fit into the housing 40. In another embodiment, the insulator may be installed into the housing and the alignment pins 42 placed through the insulator and secured to the housing to align the components.

In embodiments, the alignment pin apertures 52 operate to position and retain the insulator in the housing 40. In various embodiments, the insulator 50 may have a plurality of alignment pin apertures 52 providing one insulating separator design for a multitude of applications or configurations. The insulator 50 may be made of a suitable non-conductive material such as plastic or ceramic. The insulator 50 provides electrical insulation between the electrical contact of the connector, such as prongs 33, and the alignment pins 42 and housing 40. In some embodiments, the alignment pins 42 and housing 40 are formed of conductive material, such as steel or other metal, and must therefore be electrically isolated from the electrical connections. In other embodiment, the housing 40 and alignment pins 42 may be constructed of non-conductive materials or may be provided with a non-conductive coating reducing or eliminating the need for a separate insulator to electrically isolate the prongs 33 from the housing 40. In various embodiments, the bus-bar 54 is also electrically isolated from the housing 40 and alignment pins 42 such as by being physically separate from the housing as illustrated.

In some embodiments, the housing 40 is adapted to receive the insulator 50 to isolate the electrical current flowing between the battery electrical connector 14 of the rechargeable battery 10 and the battery management system electrical connector 32 of the battery management system 30. In one embodiment, the electrical contact of the battery management system electrical connector 32 is positioned by the insulator 50 in a defined position relative to the alignment pins 42. As shown, the prongs 33 of the electrical contact may be connected to the bus-bar 54 through one or more pre-formed holes in the insulator 50. The configuration of the insulator 50 thus positions the electrical contacts in a determined position relative to the alignment pins 42 within the housing 40 and ensures the battery management system electrical connector 32 is configured as needed to mate with the corresponding battery electrical connector. In some embodiments, the housing 40 includes mounting features 60 for mounting the housing 40 within the battery management system 30. In some embodiments, as shown, the mounting features are tapped holes for receiving mounting screws or other threaded fasteners (as shown in FIG. 4), to attach the housing 40 to the interface plate 35 or the battery management system. In this manner, the housing 40 and alignment pin 42 provides a means for aligning a battery management system electrical connector (i.e., a second electrical connector) of a battery management system to the overall battery management system, e.g., relative to the cover 34.

Referring again to FIG. 4, in embodiments, the interface plate 35 is also provided. The interface plate 35 may be a portion of the cover of the battery management system 30. In other embodiments, the interface plate 35 may be positioned between and mounted to either the rechargeable battery 10 or the battery management system 30. In embodiments, the interface plate 35 engages the alignment plate 20 of the rechargeable battery 10 and engages the alignment pin 42 of the battery management system electrical connector 32. In one embodiment, the housing 40 of the battery management system electrical connector 32 is connected to one side of the interface plate 35 using the mounting features of the housing. The interface plate 35 includes a first interface portion configured to mate with the alignment plate 20 of the rechargeable battery 10. In one embodiment, the first interface portion is an aperture 41 in the interface plate 35 configured to receive the alignment stud 27 illustrated in FIG. 3. In other embodiments, the first interface portion is an alignment stud configured to mate with an alignment plate aperture 28, such as illustrated in FIG. 2. In various embodiments, the engagement of the alignment plate 20 with the first interface portion ensures the battery electrical connector 14 (i.e., the first electrical connector) is in a determined position relative to the interface plate 35 for electrically coupling the battery management system to the rechargeable battery.

In a similar manner, the interface plate 35 includes a second interface portion configured to mate with the alignment pin of the battery management system electrical connector (i.e., the second electrical connector). In the embodiment illustrated in FIG. 4, the second interface portion includes an aperture 43 (second interface portion aperture) which receives the alignment pin 42 from the housing 40. The position of the aperture 43 on the interface plate 35 determines the position of the alignment pin 42 and correspondingly the position of the electrical contact 56 (shown in FIG. 5) of the battery management system connector relative to the interface plate. To minimize variation in the position of the respective electrical contacts, the clearance between the aperture 43 and the alignment pin 42 may be limited to no greater than 2 millimeters, no greater than 1 millimeter, or no greater than 0.5 millimeters depending upon the configuration selected. In other embodiments, the interface plate 35 is provided with one or more alignment pins and the housing of the battery management system connector is provided with one or more alignment apertures configured to receive the alignment pins. In one embodiment, the interface plate 35 is constructed of sheet metal with an opening through which the electrical contact of at least one of the battery electrical connector and battery management system electrical connector pass. The aperture 41 and the aperture 43 are positioned in the interface plate 35 to align the battery electrical connector 14 and the battery management system electrical connector 32 so that upon engagement the alignment features of the respective connectors engage first, thereby ensuring proper alignment for the subsequent engagement of the electrical contacts. In this manner, the interface plate 35 provides a means for aligning the alignment plate 20 and the alignment pin 42 so as to align the battery electrical connector 14 and the battery management system electrical connector 32.

In some embodiments, the interface plate 35 also provides mechanical support for the battery management system 30. As previously noted, the battery management system 30 may be secured to the rechargeable battery 10. During engagement, the alignment features of the respective connectors limit lateral forces that may be imparted to the electrical contacts allowing the electrical contacts to fully seat and minimize resistance in the connection. The alignment features also provide mechanical support so that the weight of the battery management system is not borne by the electrical connectors. In addition to the mechanical support provided by the alignment features, in some embodiments, the interface plate 35 is a cover of the battery management system 30 that provides mounting tabs 44 with holes 46. Once the battery management system 30 has been connected to the rechargeable battery, the battery management system 30 may be further secured to the rechargeable battery through use of the mounting tabs 44 which are configured to support the battery management system during its operational life. In this manner, the overall reliability of the electrical connection may be improved as mechanical stresses on the electrical connection are reduced during both installation and operation of the rechargeable battery system.

The alignment pins and alignment apertures presently disclosed are illustrated having a generally circular cross-sectional configuration. In other embodiments, the cross-section of the alignment pins and alignment apertures of the first electrical connector, second electrical connector, and interface plate will be square or hexagonal, or other configurations as desired. In some embodiments, the configuration of the alignment pins and alignment apertures serve as a keying mechanism to prevent improper connection of the battery management system to the rechargeable battery.

Unless otherwise specified, the term "pin" as used herein, such as the pin(s) 42, refers to a protuberance generally, and not necessarily a round or cylindrical protuberance. However, in embodiments, the pins are generally elongate and cylindrical. Another embodiment relates to a rechargeable battery system. The system includes an alignment plate having an alignment plate aperture. The system additionally includes a rechargeable battery having a first electrical connector. The first electrical connector extends through and is aligned by the alignment plate aperture, and the alignment plate is mounted to the rechargeable battery. The system further includes a battery management system having a second electrical connector configured to male with the first electrical connector. The second electrical connector comprises a housing, at least one alignment pin, an insulator disposed within the housing, and an electrical contact at least partially disposed within the housing. The alignment pin is secured to the housing in a determined position relative to the electrical contact. The insulator includes an aperture that receives the alignment pin to align the insulator within the housing. The system further comprises an interface plate connected to one or both of the rechargeable battery or the battery management system. The interface plate has a first interface portion and a second interface portion. The first interface portion is configured to mate with the alignment plate, and the second interface portion is configured to mate with the alignment pin, to align the first electrical connector with the second electrical connector.

Another embodiment relates to a rechargeable battery system. The system includes an alignment plate having an alignment plate aperture. The alignment plate aperture is configured to receive a first electrical connector of a rechargeable battery there through. The system additionally includes an assembly for a second electrical connector. The assembly comprises a housing configured to house an electrical contact of the second electrical connector; and at least one alignment pin. The alignment pin is secured to the housing in a determined position relative to a position of the electrical contact when housed in the housing. The system further includes an interface plate having a first interface portion and a second interface portion. The first interface portion is configured to mate with the alignment plate, and the second interface portion is configured to mate with the alignment pin, to align the first electrical connector with the second electrical connector.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term. Moreover, unless specifically stated otherwise, any use of the terms "first." "second," etc., do not denote any order or importance, but rather the terms "first." "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be." The terms "generator" and "alternator" are used interchangeably herein (however, it is recognized that one term or the other may be more appropriate depending on the application). The term "instructions" as used herein with respect to a controller or processor may refer to computer executable instructions.

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A rechargeable battery system comprising:
a rechargeable battery housed within an outer casing, the rechargeable battery having a first electrical connector;
an alignment plate mounted outside of the outer casing of the rechargeable battery on an exterior surface thereof, wherein the first electrical connector is aligned with the alignment plate;
a battery management system having a second electrical connector configured to mate with the first electrical connector, wherein the second electrical connector comprises a housing, at least one alignment pin mounted to the housing, and an electrical contact secured to the housing in a fixed position, wherein the alignment pin is disposed in the housing in a fixed position relative to the electrical contact; and
an interface plate having a first interface portion and a second interface portion, wherein the first interface portion is configured to mate with the alignment plate that is mounted to the outer casing of the rechargeable battery, and wherein the second interface portion is configured to mate with the alignment pin fixed in the housing of the second electrical connector so as to align the first electrical connector with the second electrical connector.

2. The rechargeable battery system as claimed in claim 1, wherein the interface plate is a cover plate of the battery management system.

3. The rechargeable battery system as claimed in claim 1, wherein the second interface portion comprises an aperture configured to receive the alignment pin.

4. The rechargeable battery system as claimed in claim 1, wherein the alignment plate comprises an alignment plate body and an alignment stud extending from the alignment plate body, and the first interface portion of the interface plate comprises an aperture configured to receive the alignment stud of the alignment plate.

5. The rechargeable battery system as claimed in claim 1, wherein the housing of the second electrical connector comprises a die-cast housing.

6. The rechargeable battery system as claimed in claim 1, wherein the alignment pin is press-fit into the housing.

7. The rechargeable battery system as claimed in claim 1, wherein the second electrical connector further comprises an insulator disposed within the housing, wherein the insulator includes an aperture that receives the alignment pin to align the insulator within the housing.

8. The rechargeable battery system as claimed in claim 7, wherein the insulator secures the electrical contact in a determined position relative to the alignment pin.

9. The rechargeable battery system as claimed in claim 1, wherein the first electrical connector comprises at least one socket and the second electrical connector comprises at least one prong configured to be inserted into the at least one socket.

10. The rechargeable battery system as claimed in claim 1, wherein the second electrical connector comprises at least one socket and the first electrical connector comprises at least one prong configured to be inserted into the at least one socket.

11. The rechargeable battery system as claimed in claim 1, wherein a tolerance between the alignment pin and the second interface portion is no greater than 0.5 millimeters.

12. The rechargeable battery system as claimed in claim 1, wherein the first electrical connector and second electrical connector are electrically insulated from the interface plate.

13. The rechargeable battery system as claimed in claim 1, wherein the first electrical connector comprises a ceramic outer covering configured to insulate the first electrical connector from the alignment plate.

14. A rechargeable battery system comprising:
a rechargeable battery housed within an outer casing having at least one outer casing aperture, the rechargeable battery having a first electrical connector;
an alignment plate mounted outside of outer casing of the rechargeable battery on an exterior surface thereof, the alignment plate having an alignment plate aperture that aligns with the outer casing aperture, wherein the first electrical connector extends through the aligned apertures;
a battery management system having a second electrical connector configured to mate with the first electrical connector, wherein the second electrical connector comprises a housing, at least one alignment pin, an insulator disposed within the housing, and an electrical contact secured to the housing in a fixed position, wherein the alignment pin is mounted to the housing in a fixed position relative to the fixed position of the electrical contact, and wherein the insulator includes an aperture that receives the alignment pin to align the insulator within the housing; and
an interface plate connected to one or both of the rechargeable battery or the battery management system, the interface plate having a first interface side and a second interface side, wherein the first interface side is configured to mate with the alignment plate that is mounted to the outer casing of the rechargeable battery and wherein the second interface side is configured to mate with the alignment pin fixed in the housing of the second electrical connector so as to align the first electrical connector with the second electrical connector.

15. A rechargeable battery system comprising:
an alignment plate mounted outside of an outer casing of a rechargeable battery on an exterior surface thereof, the alignment plate having an alignment plate aperture that aligns with an outer casing aperture of the rechargeable battery, wherein the aligned apertures receive a first electrical connector of the rechargeable battery therethrough;
an assembly for a second electrical connector, the assembly comprising:
a housing configured to house an electrical contact of the second electrical connector, the electrical contact secured to the housing in a fixed position; and
at least one alignment pin mounted to the housing in a fixed position relative to a fixed position of the electrical contact; and
an interface plate having a first interface side and a second, opposite interface side, wherein the first interface side is configured to mate with the alignment plate that is mounted to the outer casing of the rechargeable battery and wherein the second interface side is configured to mate with the alignment pin fixed in the housing of the assembly so as to align the first electrical connector with the second electrical connector.

* * * * *